United States Patent Office 3,255,188
Patented June 7, 1966

3,255,188
HYDROXY-3-SUBSTITUTED-2H-1,4-
BENZOXAZIN-2-ONES
Robert Bruce Moffett, Kalamazoo, Mich., assignor to The
Upjohn Company, Kalamazoo, Mich., a corporation of
Delaware
No Drawing. Filed Nov. 20, 1963, Ser. No. 325,176
4 Claims. (Cl. 260—244)

This invention relates to novel chemical compounds and to a process for preparing the same and is particularly directed to hydroxy-3-substituted-2H-1,4-benzoxazine-2-ones and the preparation thereof.

The novel compounds of the invention have the following structural formula

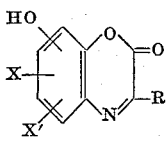

Formula I wherein X and X' are selected from the group consisting of hydrogen and hydroxy and R is a member selected from the group consisting of phenyl and lower-alkyl having from 1 to 4 carbon atoms, inclusive, e.g., methyl, ethyl, propyl and butyl, including isomeric forms thereof.

The novel compounds of Formula I are prepared by condensing a 2-amino-hydroxyphenol of the formula

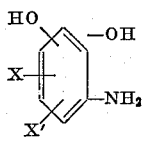

wherein X and X' are as defined above, with a lower-alkyl glyoxylate of the formula

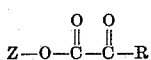

wherein R is as defined above and Z is lower-alkyl of from 1 to 8 carbon atoms, inclusive.

The condensation is accelerated by gentle heating (from room temperature, about 25° C., to about 180° C.) and advantageously is carried out in a non-oxidizing atmosphere, for example, nitrogen. The proportions of reactants can be varied over a wide range. Equimolar amounts can be used though in general it is preferred to use an excess of the lower-alkyl glyoxylate, say up to about 100% excess. An inert solvent, for example, toluene, ethanol, dioxane, and tetrahydrofuran, can be used if desired.

The novel compounds of the invention have tranquilizing and sedative activity and can be used as central nervous system depressants, for example, to calm agitated mammals or animals, e.g., laboratory rats and mice. The novel compounds are also active enzyme inhibitors, for example, the enzyme systems O-methyl transferase and 5-hydroxytryptophan decarboxylase can be inhibited by introduction of the novel compounds into the environments of the said enzyme systems. Further, the compounds can be used as analgetics and anti-obesity agents in animals.

The invention can be more fully understood by reference to the following examples which are given by way of illustration and not of limitation. Parts and percentages are by weight unless otherwise specified.

*Example 1.—5-hydroxy-3-phenyl-2H-1,4-benzoxazin-2-one*

An aqueous solution of 34 gm. (0.4 mole) of sodium bicarbonate was added to an aqueous solution of 32.3 gm. (0.2 mole) of 2-aminoresorcinol hydrochloride and the mixture extracted with ether. The ether solution was washed with water and evaporated to dryness in vacuo below 30° C. to provide 16 gm. of brown crystalline 2-aminoresorcinol free base.

16 gm. (0.125 mole) of 2-aminoresorcinol (free base) was mixed with 35.6 gm. (0.2 mole) of ethyl phenylglyoxylate and heated under nitrogen in an oil bath at 90–140° C. for a few minutes. The mixture crystallized and the crystals were boiled with 200 ml. methanol, cooled, and the crystals collected on a filter to provide 16.6 gm. (55.5% theory) of yellow-tan crystals of 5-hydroxy-3-phenyl-2H-1,4-benzoxazin-2-one having a melting point of 179–181° C. Recrystallization from acetone-ethanol gave olive-colored crystals of 5-hydroxy-3-phenyl-2H-1,4-benzoxazin-2-one having a melting point of 183.5–184° C.

Anal.—Calcd. for $C_{14}H_9NO_3$: C, 70.29; H, 3.79; N, 5.86; O, 20.07. Found: C, 70.31; H, 3.88; N, 5.90; O, 20.57.

*Example 2*

Following the procedure of the preceding Example 1, substituting for the 2-aminoresorcinol (free base) of the example, an equimolar amount each of 2-aminophloroglucinol,
4-aminopyrogallol, and
3-amino-1,2,4,5-tetrahydroxybenzene, there can be obtained 5,7-dihydroxy-3-phenyl-2H-1,4-benzoxazin-2-one,
7,8-dihydroxy-3-phenyl-2H-1,4-benzoxazin-2-one, and
5,6,8-trihydroxy-3-phenyl-2H-1,4-benzoxazin-2-one,
respectively.

*Example 3.—5-hydroxy-3-methyl-2H-1,4-benzoxazin-2-one*

21.4 gm. (0.17 mole) of 2-aminoresorcinol (free base) was mixed with 39.5 gm. (0.34 mole) of ethyl pyruvate. The condensation started at room temperature and the mixture warmed. The mixture was heated for 5 minutes on a steam bath and on cooling crystals separated. The mixture was dissolved in 200 ml. of hot ethanol and on cooling crystals separated which were collected on a filter to provide 9.85 gm. of brown crystals of 5-hydroxy-3-methyl-2H-1,4-benzoxazin-2-one having a melting point of 130–136° C. Recrystallization from isopropyl alcohol provided 8.45 gm. of the compound as tan crystals having a melting point of 135.5–137° C.

Anal.—Calcd. for $C_9H_7NO_3$: C, 61.01; H, 3.98; N, 7.91; O, 27.09. Found: C, 60.89; H, 3.98; N, 8.06; O, 27.23.

*Example 4*

Following the procedure of the preceding Example 3, substituting for the ethyl pyruvate of the example, an equimolar amount each of Ethyl ethylglyoxylate,
Ethyl propylglyoxylate,
Ethyl isopropylglyoxylate, and
Ethyl butylglyoxylate, there can be obtained 5-hydroxy-3-ethyl-2H-1,4-benzoxazin-2-one,
5-hydroxy-3-propyl-2H-1,4-benzoxazin-2-one, 5-hydroxy-3-isopropyl-2H-1,4-benzoxazin-2-one, and 5-hydroxy-3-butyl-2H-1,4-benzoxazin-2-one, respectively.

*Example 5.—7,8-dihydroxy-3-methyl-2H-1,4-benzoxazin-2-one*

A solution of 0.03 mole of 4-aminopyrogallol in 100 ml. of ethanol was prepared by hydrogenation of 5.13 gm. (0.03 mole) of 4-nitropyrogallol and kept under nitrogen. To the ethanolic 4-aminopyrogallol solution was added 6.13 gm. (0.06 mole) of methyl pyruvate. The solution was evaporated in vacuo on a steam bath leaving a dark residue. The dark residue was boiled with 300 ml. of ethyl acetate, filtered, concentrated and cooled to provide 7,8-dihydroxy-3-methyl-2H-1,4 - benzoxazin - 2 - one as a greenish grey solid having a melting point of 246–247° C. Upon several recrystallizations from ethyl acetate, the compound was obtained as yellow crystals having a melting point of 249–252° C.

*Anal.*—Calcd. for $C_9H_7NO_4$: C, 55.96; H, 3.65; N, 7.25; O, 33.13. Found: C, 55.83; H, 3.72; N, 7.40; O, 33.85.

What is claimed is:
1. A compound of the formula:

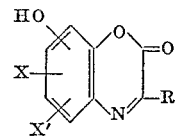

wherein X and X' are members selected from the group consisting of hydrogen and hydroxy, and R is a member selected from the group consisting of phenyl and lower-alkyl having from 1 to 4 carbon atoms, inclusive.
2. 5-hydroxy-3-phenyl-2H-1,4-benzoxazin-2-one.
3. 5-hydroxy-3-methyl-2H-1,4-benzoxazin-2-one.
4. 7,8-dihydroxy-3-methyl-2H-1,4-benzoxazin-2-one

References Cited by the Examiner
FOREIGN PATENTS
815,279   6/1959   Great Britain.

WALTER A. MODANCE, *Primary Examiner.*
ROBERT T. BOND, *Assistant Examiner.*